C. H. HACKETT & T. W. MORGAN.
LINER FOR CENTRIFUGAL CREAM SEPARATORS.
APPLICATION FILED NOV. 2, 1907.
914,488.
Patented Mar. 9, 1909.
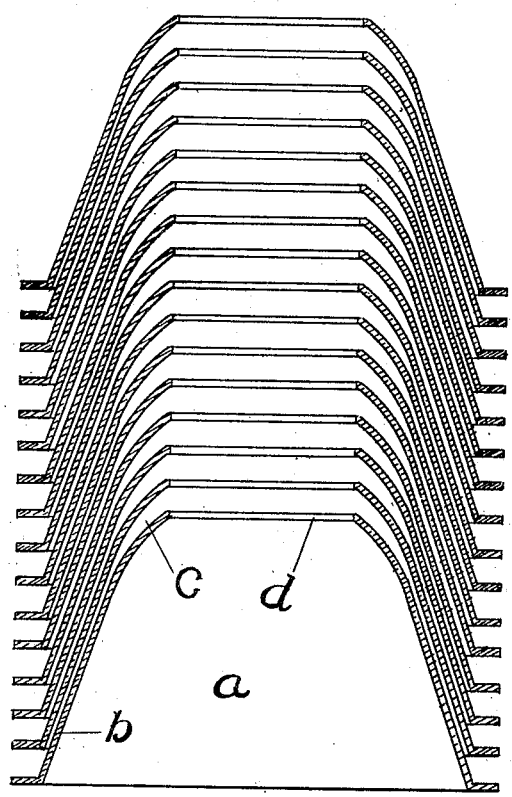
WITNESSES:
INVENTORS:
Charles H. Hackett and
Thomas W. Morgan
BY
G. C. Kennedy
ATTORNEY

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

LINER FOR CENTRIFUGAL CREAM-SEPARATORS.

No. 914,488.  Specification of Letters Patent.  Patented March 9, 1909.

Application filed November 2, 1907. Serial No. 400,403.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Liners for Centrifugal Cream-Separators, of which the following is a specification.

Our invention relates to improvements in liners for centrifugal cream separators, and the object of our invention is to perfect the action of that class of liners which consist of a vertical series of superimposed separated hollow frusta by modifying the form of the frusta so as to afford more clearance space between their inner edges for the inward movement of the cream therebetween and thus obviate any chance of the cream coagulating in the inner zone of the liner between the frusta at comparatively low temperatures. This object we have accomplished by the means which are hereinafter described and claimed, and which are illustrated in the accompanying drawing, in which the figure is a central vertical axial section of the liner of a centrifugal cream separator, composed of our improved frustal baffling annuli.

The liner shown, is composed of a vertical series of separated hollow frusta *a*, superimposed upon one another, their central openings in alinement and all concentric to a common axis. The frusta are designed to intersect both the outer and the neutral zones of the bowl and extend nearly to the cream zone, enough space, however, being left between the cream zone and the inner edges *d* of the frusta to permit a current of the full milk to pass therebetween to be sprayed by centrifugal force between the frusta of the liner and against the baffling surfaces of the frusta, the separated cream seeking the axis and the skimmed milk moving between the parallel portions *b* of the frusta to escape at their outer edges.

It will be observed that the outer portion *b* of each frustum for approximately two-thirds of the length of the frustum is formed as a portion of the surface of a cone, which causes these portions to lie in a parallel relation to each other. By this arrangement the frusta can be closely piled together in the bowl, so as to leave but a small interspace between any two frusta, the result being that a maximum amount of baffling surfaces may be crowded into a given space, for it has been experimentally demonstrated that an interspace in the outer zone of the liner of no more than one thousandth of an inch in height is of most efficiency in separating the minuter globules of cream from the nearly stripped milk in that zone. While it is necessary for said purpose to crowd closely together the outer portions of the frusta, it is equally necessary to provide ample interspaces between the portions thereof forming their innermost third. This is for the reason that it is in the inner zone of the liner adjacent to the so-called cream zone that the greater proportion of the cream is separated from the full milk. In this region, therefore, greater clearance space is demanded between the frusta, that the cream may find easy vent to move to the cream zone. If the frusta were placed to be very close together in this region, cream, which coagulates on a slight lowering of the normal temperature, would soon, when the temperature dropped at any time, fill the narrow interspaces with a clotted mass and stop the operation of the bowl. Our invention is thus designed to subserve both said purposes perfectly, the gradual inward curvature of the inmost third of each frustum causes the interspaces *c* between the frusta to increase in height as shown and give proper clearance to the cream in the region where it forms a large proportion of the full milk, and in the outer zone where the milk passes outward between the frusta nearly stripped of cream, the frusta in their outer two thirds become parallel and baffle the milk without being clogged up by the small proportion of cream globules in that location stripped from the milk by the nearly contacting baffling surfaces.

Having described our invention, what we claim as new, and desire to secure by Letters Patent, is:—

1. A liner for a centrifugal cream separator, composed of a series of superimposed hollow frusta intersecting the outer and neutral zones of the bowl, the outer portions of such frusta being equally spaced apart, while the inner portions are inwardly curved to progressively diverge from each other.

2. A liner for a centrifugal cream separator, composed of a plurality of superimposed hollow frusta intersecting the outer and neutral zones of the bowl, spaced apart parallel to each other in their outer and medial zones, and curved inwardly in their inner zone to gradually increase the distance of their separation from each other in a direction from their outer to inner edges.

3. A liner for a centrifugal cream separator, composed of a plurality of hollow frusta spaced apart, parallel in their outer portions and having their inner portions formed and arranged relatively to each other as to diverge from each other in a direction leading from the outer zone of the bowl toward its axis.

Signed at Waterloo, Iowa, this 30th day of Oct. 1907.

CHARLES H. HACKETT.
THOMAS W. MORGAN.

Witnesses:
G. C. KENNEDY,
O. D. YOUNG.